United States Patent Office 3,148,214
Patented Sept. 8, 1964

3,148,214
ISOLATION AND PURIFICATION OF QUATERNARY AMMONIUM SALTS
Herbert Q. Smith, Trenton, N.J., assignor to Pennsalt Chemicals Corporation, Philadelphia, Pa., a corporation of Pennsylvania
No Drawing. Filed Sept. 11, 1961, Ser. No. 137,061
11 Claims. (Cl. 260—567.6)

This invention relates to a novel process for the isolation of quaternary ammonium salts from their aqueous solution. More particularly this invention deals with the isolation of quaternary ammonium salts by adding certain aliphatic amines to their aqueous solution.

Quaternary ammonium salts are well known compounds useful as disinfectants, nerve blocking agents in brain surgery, surfactants, sterilants, etc. Because they are salts having an anion such as halide, sulfate, nitrate, phosphate, etc., they are quite water soluble and their isolation from aqueous solution is often difficult. A successful, if cumbersome, method is evaporation to dryness, preferably under reduced pressure. In addition to being an uneconomical commercial method, this technique may cause the salts to undergo decomposition under the evaporation conditions. Furthermore, the product will be contaminated with any impurities in the original aqueous solution. Thus, quaternary ammonium salts isolated in this manner are likely to be colored and must be recrystallized from a suitable solvent system.

An alternate isolation technique involves removal of the water solvent by azeotropic distillation. In this procedure a suitable solvent, such as benzene, is added to the aqueous system and distillation carried out until all of the water is removed from the system. The salt remaining behind is insoluble in the solvent and is filtered off. In this procedure, it is also apparent that any nonvolatile impurities will contaminate the product.

It has now been found, in accord with this invention, that water soluble quaternary ammonium salts may be isolated from their aqueous solution by adding to the aqueous solution a water-miscible aliphatic amine and separating the solid quaternary ammonium salt which precipitates. The successful use of water-miscible aliphatic amines in this invention is quite unexpected since aliphatic amines are not generally considered to be solvents for crystallization. Furthermore, the process is specific to the use of water-miscible amines. Other water-miscible solvents, such as dioxane, acetone, methanol, ethanol, dimethylformamide, etc., are inoperable in that they give an oil-like product.

In carrying out the process of this invention a concentrated aqueous solution of the quaternary and the aliphatic amine are mixed and the solid which immediately forms is filtered off, washed with a volatile organic solvent (e.g. an ether, a hydrocarbon solvent such as benzene, toluene, etc., or other inert organic solvent) and the solid is then dried. Instead of filtering, decantation and centrifugation procedures may be used, but it is important to remove all of the aliphatic amine to ensure a colorless product.

The isolation procedure of this invention is preferably used with aqueous solutions containing at least about 50% by weight of the quaternary ammonium salt. Less concentrated solutions may be used (about 20% by weight), but this requires a larger amount of aliphatic amine which tends to make the procedure more costly. The higher the concentration of quaternary salt concentration, the less amine that is required, and, of course, the higher the quaternary salt concentration, the more desirable is the starting material.

As indicated, the amines used in the invention are water-miscible aliphatic amines. Generally, these water-miscible amines will contain from about two to six carbon atoms in the molecule. Water-miscible primary and secondary amines are operable, but tertiary amines (e.g. N,N,N-trialkylamines) are not generally water-miscible and therefore are of no value in this invention.

The amount of amine to be mixed with the aqueous quaternary salt solution will depend upon a number of factors and accordingly, it may vary widely. For example, as already indicated, where the concentration of salt in the aqueous solution is low a greater amount of amine will be employed. Likewise, larger amounts of amine will be employed with the more hygroscopic salts such as diethyldimethylammonium nitrate. Although usually carried out at room temperature, the process may be carried out at higher or lower temperatures with more or less amine being required. Generally, about 5 to 10 volumes of amine per volume of quaternary salt solution will be used, but up to 50 volumes of amine can be used effectively. After filtering off the precipitated salt, it is often desirable to add additional amine to a sample of the filtrate to see if more quaternary salt can be precipitated and, if so, additional amine may be added to the body of the filtrate to increase the yield. Examples of amines useful in the invention include ethylamine, diethylamine, n-propylamine, isopropylamine, n-butylamine, N-methylbutylamine, tertiary-butylamine, the isomeric amylamines, 2-ethylbutylamine, and the like.

As indicated above, this invention is broadly applicable to aqueous solutions of a wide variety of quaternary ammonium salts. Preferably, the quaternary ammonium salts will be inorganic salts such as halides (fluorides, chlorides, bromides, iodides, etc.), nitrates, sulfates, phosphates, and the like. These quaternary ammonium salts are well know compounds and may be selected from any of the wide variety existing, particularly those quaternary salts in which the groups attached to the nitrogen atom of said quaternary salts are hydrocarbon groups containing from 1 to 7 carbon atoms. Examples of quaternary ammonium compounds useful include the tetra-lower alkyl-ammonium halides, the quaternary ammonium salts of polyamines (e.g. diamines, triamines, etc.), the quaternary ammonium salts of polyalkylenepolyamines (e.g. those quaternaries from triethylenediamine) and the like. Examples of such quaternary salts include those obtained by quaternizing trimethylamine, dimethylethylamine, triisopropylamine, tributylamine, N,N'-dimethyldiethylenediamine, triethylenediamine, and diethylene methylethylenediamine with an alkyl halide such as methyl bromide and ethyl chloride. In lieu of the alkyl and alkyleneamine derived quaternary compounds, others may also be used, as for example those obtained by the action of benzyl chloride on other tertiary aromatic and heterocyclic amines such as pyridine and its derivatives, N-alkyl piperidines, N,N-dimethylaniline, diphenylmethylamine and the like. Some specific quaternary ammonium salts are trimethylisopropylammonium chloride, trimethylethylammonium iodide, dimethyldiethylammonium phosphate, dimethyl-tert-butylammonium sulfate, diethylisopropylammonium chloride, N,N'-tetramethyl-n-propylenediammonium dichloride, N,N'-tetramethylethylenediammonium dibromide, N,N'-dimethyltriethylenediammonium dichloride, N,N'-diethyltriethylenediammonium disulfate, N-methyl-N'-ethyltriethylenediammonium dichloride, N-methyl - N' - isopropyltriethylenediammonium dichloride and N,N'-dimethyldiethylenepropylenediammonium dichloride (i.e.

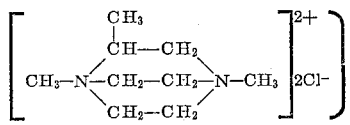

Many of these triethylenediamine derivatives are described and their preparation given in S.N. 799,115, filed March 13, 1959, in the names of T. E. Deger and H. Q. Smith, and now issued as U.S. Patent 3,063,880.

Quaternary ammonium nitrates are frequently desired as solids because of their value in rocket and other high energy fuels. Accordingly, this process has particular value for the isolation of such nitrates. These nitrate compounds will preferably be derived from the group of rather compact quaternary ammonium nitrates such as the tetra-lower alkylammonium nitrates, the quaternary ammonium nitrates of polyamines (e.g., diamines, triamines, etc.), and the quaternary ammonium salts of polyalkylenepolyamines (e.g. those quaternaries from piperazines and triethylenediamine). Some specific quaternary nitrates of particular value in addition to those named above which may be isolated by this invention the tetramethylammonium nitrate, tetraethylammonium nitrate, dimethyltriethylenediammonium dinitrate, tetra-n-butylammonium nitrate, N,N'-dimethyldiethylenepropylenediammonium dinitrate, and the like.

The following examples are given to further illustrate the invention:

Example 1

To 5 parts of a 55% aqueous solution of isopropyltrimethylammonium nitrate is added 35.3 parts of diethylamine. The solid is filtered off, washed with diethylamine, and dried in a vacuum oven at 80°. There is obtained in quantitative yield 2.7 parts of white free-flowing solid.

Example 2

To 8,000 parts of diethylamine stirred mechanically is added slowly 790 parts of 66% by weight aqueous isopropyltrimethylammonium nitrate. The precipitated solid is filtered off, triturated with 879 parts of benzene, filtered off again, and is washed with 439 parts of benzene. The product is dried in an oven at 50°. There is obtained in quantitative yield 522 parts of nearly white, free-flowing solid.

Example 3

To 58 parts of about 30% aqueous tert-butyltrimethylammonium nitrate is added 353 parts of diethylamine. The solid is filtered off, washed with 35 parts of diethylamine, dried in a vacuum oven at 80° for several hours, and finally is dried in an atmospheric pressure oven at 90°. There is obtained 11.0 parts of grayish-white solid, M.P. 265–270°.

Example 4

To a solution of 25 parts of t-butyltrimethylammonium chloride in 100 parts of water there is added 2119 parts of diethylamine and the precipitate of 17 parts of the salt is filtered off.

Example 5

To a 50% by weight solution containing 4 parts of isopropyltrimethylammonium nitrate there is added 29 parts of n-butylamine. The precipitated salt is filtered, washed first with the amine, then with benzene and is dried at 60° C. In this way, 1.8 parts of pure, white, isopropyltrimethylammonium nitrate are obtained.

Example 6

Example 5 is repeated with the same results except that 26.9 parts of isopropylamine is used.

Example 7

Example 5 was repeated with identical results except that 29.3 parts of n-amylamine is used.

Example 8

To 43.8 parts of diethylamine, there is added with stirring 3.3 parts of a 30% by weight aqueous solution of isopropyltrimethylammonium nitrate. The solid is filtered to recover 0.6 part of the quaternary nitrate salt.

Example 9

To 45.9 parts of diethylamine there is added with stirring 1.3 parts of a 78% by weight aqueous solution of diethyldimethylammonium nitrate. The precipitate is filtered to recover 0.6 part of the quaternary nitrate salt.

This example is a good illustration of the high efficiency of the method of this invention because of diethyldimethylammonium nitrate is a very hygroscopic material which is difficult to obtain in anhydrous form.

Example 10

Example 9 is repeated except that the nitrate solution used is 5 parts of a 50% aqueous solution of N,N'-dimethyldiethylenepropylenediammonium dinitrate. The yield of solid as dinitrate product is excellent.

Example 11

Following the steps of Example 10, N,N'-dimethyltriethylenediammonium dinitrate is recovered from its 50% aqueous solution in good yield.

It will be understood that changes may be made in the above examples without departing from the spirit and scope of the invention and the invention is not to be limited by the above description and examples.

I claim:

1. A process for the isolation of water-soluble quaternary ammonium salts from their aqueous solution wherein said salts are selected from the group consisting of halides, nitrates, sulfates, and phosphates of quaternary ammonium compounds selected from the class consisting of tetraalkyl ammonium compounds, quaternary ammonium salts of polyamines and quaternary salts of polyalkylenepolyamines is which the groups attached to the nitrogen atoms of said quaternary salts are hydrocarbon groups containing from 1 to 7 carbon atoms which comprises mixing with one volume of said aqueous solution from about five to fifty volumes of a water-miscible alkylamine containing from two to six carbon atoms selected from the group consisting of primary and secondary amines and separating solid quaternary ammonium salt.

2. The process of claim 1 wherein the quaternary ammonium salt is a halide.

3. The process of claim 1 wherein the quaternary ammonium salt is a nitrate.

4. A process as in claim 1 for the isolation of a quaternary ammonium nitrate from an aqueous solution containing at least about 50% by weight of said quaternary ammonium salt, which comprises mixing with one volume of said aqueous solution from about five to ten volumes of a water-miscible aliphatic amine and separating the solid quaternary ammonium nitrate which forms.

5. The process of claim 4 wherein the quaternary ammonium nitrate is derived from a polyalkylene polyamine.

6. The process of claim 5 wherein the nitrate salt is N,N'-dimethyltriethylenediammonium dinitrate.

7. The process of claim 5 wherein the nitrate salt is N,N′-dimethyldiethylenepropylenediammonium dinitrate.

8. The process of claim 4 wherein the nitrate is a tetra-lower alkyl quaternary ammonium nitrate.

9. The process of claim 8 wherein the nitrate is isopropyltrimethylammonium nitrate.

10. The process of claim 8 wherein the nitrate is diethyldimethylammonium nitrate.

11. A process for the isolation of a quaternary ammonium nitrate from an aqueous solution containing at least 50% by weight of said quaternary nitrate, wherein said nitrate is a quaternary ammonium nitrate selected from the class consisting of tetra-alkyl ammonium nitrates, quaternary ammonium nitrates of polyamines and quaternary nitrates of polyalkylenepolyamines in which the groups attached to the nitrogen atoms of said quaternary compounds are hydrocarbon groups containing from 1 to 7 carbon atoms, which process comprises mixing with one volume of said aqueous solution from about 5 to 10 volumes of diethylamine and separating the solid quaternary ammonium nitrate which forms.

References Cited in the file of this patent
FOREIGN PATENTS
717,754    Great Britain _____ Nov. 3, 1954